(No Model.)
F. A. HALL.
PRUNING IMPLEMENT.
No. 390,166. Patented Sept. 25, 1888.
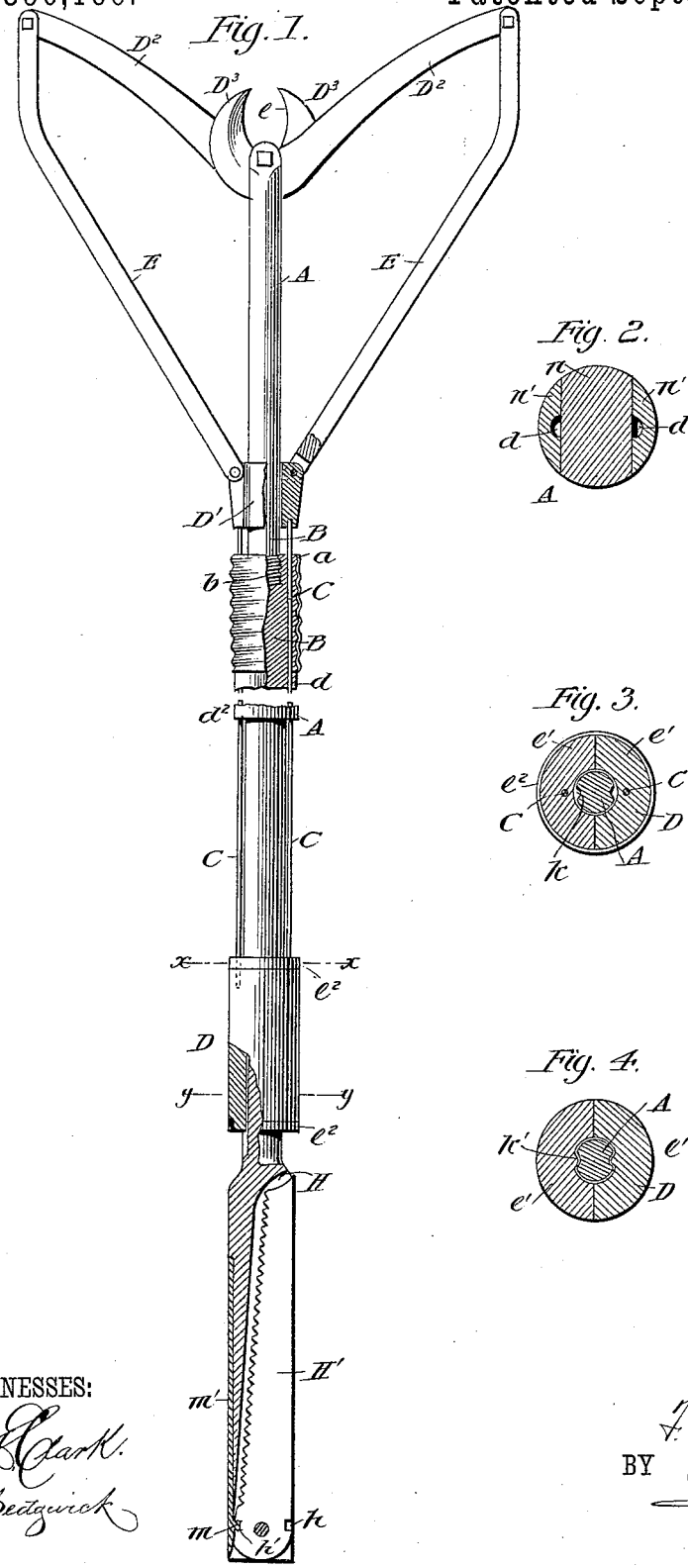
WITNESSES:
INVENTOR:
F. A. Hall
BY Munn &Co
ATTORNEYS.

UNITED STATES PATENT OFFICE.

FRANCIS A. HALL, OF ENNIS, TEXAS, ASSIGNOR OF ONE-HALF TO WILLIAM H. FEARS, OF SAME PLACE.

PRUNING IMPLEMENT.

SPECIFICATION forming part of Letters Patent No. 390,166, dated September 25, 1888.

Application filed January 3, 1888. Serial No. 259,640. (No model.)

*To all whom it may concern:*

Be it known that I, FRANCIS ASBURY HALL, of Ennis, in the county of Ellis and State of Texas, have invented a new and Improved Pruning Implement, of which the following is a full, clear, and exact description.

The invention consists in an implement for pruning trees, vines, and shrubbery, and has for its object to provide a convenient device, simple in construction, light, and durable, which may be conveniently and effectively used for severing superfluous branches or twigs from trees, shrubs, &c.

The invention consists in the construction and combination of the several parts, as will be hereinafter fully set forth, and pointed out in the claim.

Reference is to be had to the accompanying drawings, forming a part of this specification, in which similar letters of reference indicate corresponding parts in all the figures.

Figure 1 is a side elevation of the implement, partially in section. Fig. 2 is a cross-section illustrating a modified form of construction in the staff or pole of the implement, and Figs. 3 and 4 are enlarged cross sections on lines $x\,x$ and $y\,y$ of Fig. 1.

In the drawings, A represents a staff or pole, of any desired length, which may be formed in one or more sections, B, and joined in any suitable manner, as by being provided with male and female screw-threaded portions $a$ and $b$ at the ends of the sections, engaging each other, as shown in Fig. 1. The staff or pole is provided with two parallel or nearly parallel longitudinal grooves, $d$, within which and guided thereby rods C are adapted to run, the lower ends of which rods terminate in and are secured to a hand-collar, D, embracing the staff or pole, which collar slides longitudinally upon the reduced portion below the shoulder $d^2$. The aforesaid rods C terminate at their upper ends in a second collar, D', sliding longitudinally upon the upper reduced portion of the pole, which collar D' is provided with aligning lateral projections, and to said projections are pivoted the lower ends of upwardly-extending radial link-arms E. The upper ends of the link-arms are pivoted to the outer ends of jaw-arms $D^2$, which arms are fulcrumed at their inner ends at the upper extremity of the staff or pole. At the fulcrum of the arms $D^2$ the inner ends are curved upward in opposite directions to form the scissor-like jaws $D^3$, provided with suitable approaching cutting-edges, $e$.

As seen in Figs. 3 and 4 the tubular handle D is formed preferably in two sections, $e'$, bound together by collars $e^2$, such construction permitting the disposition of the handle about the staff or pole A, and by grooving said staff or pole, as at $k$, and providing internal projections, $k'$, upon the handle-sections the said sliding handle is constrained to move without rotation or twist.

Within a central slot, H, in the butt of the staff or pole a saw-blade, H', is pivoted at its lower end, adapted to be turned upon its pivot, to lie within the slot or project therefrom in line therewith, and to be rigidly held in either position by the engagement with one or the other of notches $h\,h'$, formed in opposing edges of the saw, of a stud, $m$, formed upon a spring-plate, $m'$, secured on the butt, said notches on the blade being so located as to permit the aforesaid engagement when in either its closed or projected position.

The longitudinal grooves $d$ within the staff or pole are preferably closed, and, as seen in cross-section, Fig. 2, the pole provided with such closed grooves is formed by a middle strip, $n$, and of the outer strips, $n'$, having produced in their inner surfaces the grooves $d$, the said inner surfaces being placed against the outer sides of the middle strip and there secured, and while it is preferable to provide in the staff or pole such closed grooves the grooves may, however, be open, and again the rods may be allowed to slide on the outer surface of the staff or pole, being guided thereon by eyes or otherwise; but it is much preferred to employ closed longitudinal grooves.

The use and operation of the hereinbefore-described implement will be obvious, it being manifest that by sliding the handle up and down upon the staff or pole the jaws will alternately open and close. Thus when a branch or a shoot is brought between them they will sever the same expeditiously and without much effort on the part of the operator; and it is further obvious that the capabilities of the implement are augmented by the addition of the saw-blade, as it may be conveniently employed to sever a branch too thick for operation upon by the cutting-jaws.

Having thus described my invention, what I claim as new, and desire to secure by Letters Patent, is—

In a pruning implement, the combination, with a staff, of the jaw-arms $D^2$, pivoted to the staff and provided with the upwardly-projecting and curved jaws $D^3$, the collars D D', fitted loosely on the staff, the rods C, connecting the said collars, and the link-arms E, pivoted to the collar D' and to the jaw-arms $D^2$, substantially as herein shown and described.

FRANCIS A. HALL.

Witnesses:
W. H. FEARS,
C. M. HALL.